US012752719B2

(12) United States Patent
Rupp

(10) Patent No.: US 12,752,719 B2
(45) Date of Patent: Oct. 6, 2026

(54) PILLAR GARNISH ASSEMBLY FOR A VEHICLE

(71) Applicant: Honda Motor Co., Ltd., Tokyo (JP)

(72) Inventor: Timothy J. Rupp, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 393 days.

(21) Appl. No.: 18/625,930

(22) Filed: Apr. 3, 2024

(65) Prior Publication Data

US 2025/0313164 A1 Oct. 9, 2025

(51) Int. Cl.
*B60R 13/04* (2006.01)

(52) U.S. Cl.
CPC .................................... *B60R 13/04* (2013.01)

(58) Field of Classification Search
CPC ..... B60R 13/04; B60R 13/043; B60R 13/025; B60J 9/00; B62D 25/04
USPC ........................................... 296/193.06, 1.08
See application file for complete search history.

(56) References Cited

U.S. PATENT DOCUMENTS 6,523,887 B1 2/2003 Picken et al.
7,845,713 B2 12/2010 Terai et al.
8,348,321 B2 1/2013 Yamazaki et al.
9,663,056 B2 5/2017 Sakurai et al.
11,254,363 B2 * 2/2022 Takahashi .............. B62D 25/04
2007/0278809 A1 * 12/2007 Reed ................... B29C 67/0044 296/146.7
2011/0089719 A1 * 4/2011 Yamazaki ............... B60R 13/06 296/193.06
2014/0306480 A1 * 10/2014 Sasaki ...................... B60J 10/70 296/93
2016/0185300 A1 * 6/2016 Parlow ...................... B60R 7/04
2016/0288736 A1 * 10/2016 Hein ....................... B60R 13/04
2016/0325696 A1 * 11/2016 Rogge ..................... B60R 13/04

FOREIGN PATENT DOCUMENTS

| | | | | | |
|---|---|---|---|---|---|
| CN | 116639058 | A | * | 8/2023 | B60R 13/04 |
| JP | 2004255915 | A | * | 9/2004 | B60R 1/04 |
| JP | 4069492 | B2 | | 4/2008 | |
| JP | 5166948 | B2 | | 3/2013 | |
| JP | 5994568 | B2 | | 9/2016 | |
| JP | 2020147067 | A | * | 9/2020 | B62D 25/04 |
| KR | 20180120003 | A | * | 11/2018 | B60R 13/06 |

* cited by examiner

*Primary Examiner* — Carly W. Lynch
(74) *Attorney, Agent, or Firm* — Suzanne Gagnon; American Honda Motor Co., Inc.

(57) ABSTRACT

A pillar garnish assembly for a vehicle includes a pillar garnish adapted to be provided on a front surface of a pillar of the vehicle. The pillar garnish assembly also includes a corner garnish pivotally coupled to the pillar garnish and adapted to pivot relative to the pillar garnish about a pivot axis. The corner garnish is adapted to cover a pillar corner disposed adjacent to the pillar of the vehicle.

20 Claims, 4 Drawing Sheets

PILLAR GARNISH ASSEMBLY FOR A VEHICLE

BACKGROUND

Vehicles generally include pillar garnishes applied to A-pillars of the vehicles and corner garnishes applied to pillar corners. Due to clipping orientation for the A-Pillar garnish and the pillar corner garnish, these two parts are kept separate and require two separate tools for installing on the vehicle body. Having two separate parts adds to the work and cost of installation.

SUMMARY

In accordance with one embodiment of the present disclosure, a pillar garnish assembly for a vehicle is disclosed. The pillar garnish assembly comprises a pillar garnish adapted to be provided on a front surface of a pillar of the vehicle. The pillar garnish assembly also includes a corner garnish pivotally coupled to the pillar garnish and adapted to pivot relative to the pillar garnish about a pivot axis. The corner garnish is adapted to cover a pillar corner disposed adjacent to the pillar of the vehicle.

In accordance with another embodiment of the present disclosure, a vehicle is disclosed. The vehicle comprises a pair of pillars, a windshield arranged between the pair of pillars, and at least one pillar corner arranged adjacent to an associated pillar of the pair of pillars and extending in a longitudinal direction from the associated pillar. The at least one pillar corner is disposed between the associated pillar, a door and a fender of the vehicle. Further, the vehicle includes a pillar garnish assembly arranged covering the associated pillar and the at least one pillar corner. The pillar garnish assembly includes a pillar garnish arranged covering a front surface of the associated pillar of the vehicle, and a corner garnish arranged covering the at least one pillar corner. The corner garnish is pivotally coupled to the pillar garnish and is adapted to pivot relative to the pillar garnish about a pivot axis extending parallel to an edge of the associated pillar.

In accordance with yet a further embodiment of the present disclosure, a method for installing a pillar garnish assembly to a vehicle body is disclosed. The method comprises rotating a corner garnish of the pillar garnish assembly in a first direction relative to a pillar garnish about a pivot axis, and engaging the pillar garnish with a pillar of the vehicle body upon rotation of the corner garnish in the first direction. The method further includes rotating the corner garnish in a second direction opposite to the first direction upon engagement of the pillar garnish with the pillar, and securing the corner garnish to a pillar corner of the vehicle body. The pillar corner is disposed adjacent to the pillar.

BRIEF DESCRIPTION OF THE DRAWINGS

Certain embodiments of the present disclosure will be better understood from the following description taken in conjunction with the accompanying drawings in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows. Embodiments are hereinafter described in detail in connection with the views and examples of FIGS. 1-4, wherein like numbers indicate the same or corresponding elements throughout the views.

Figure 1:
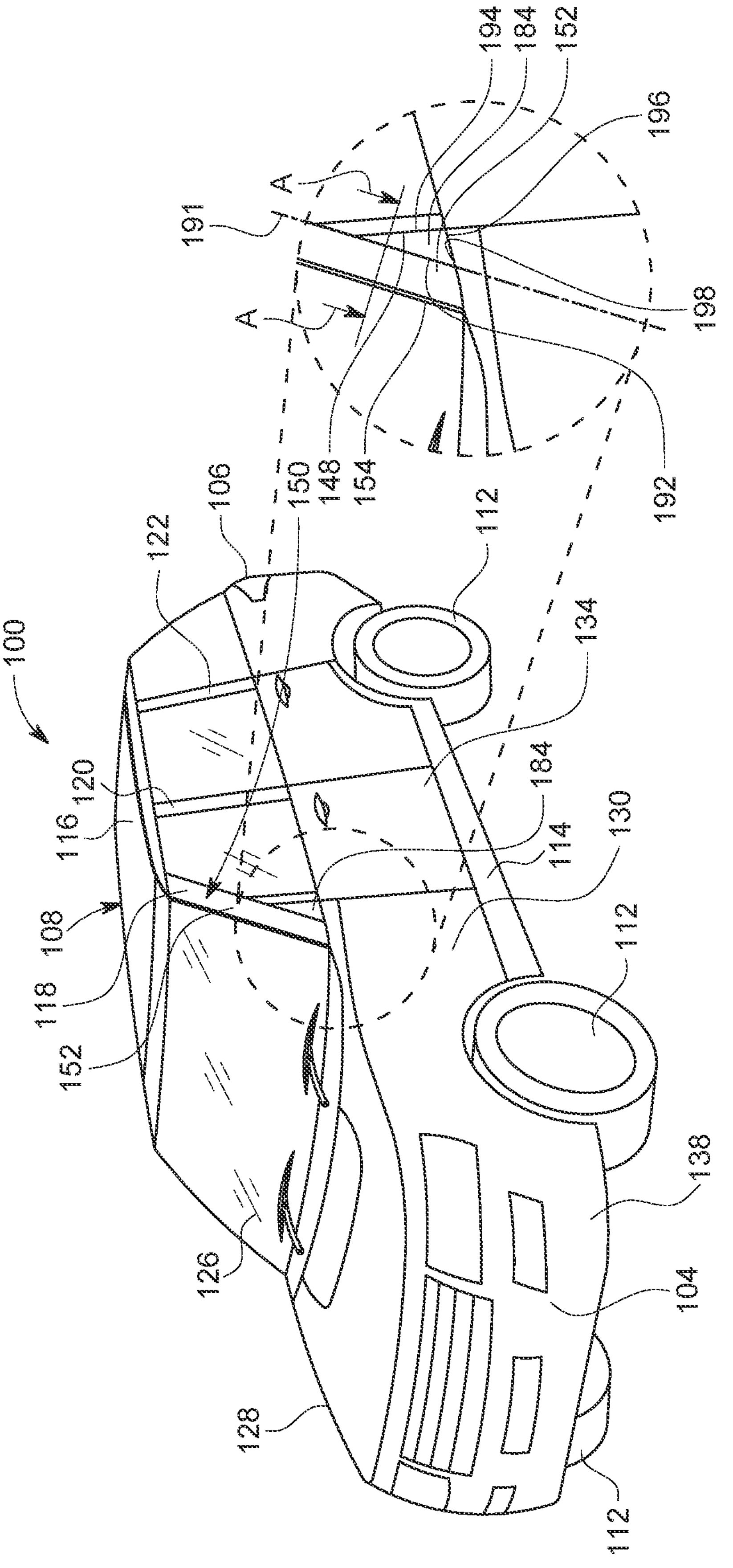
FIG. 1 is a perspective view of a vehicle, in accordance with one embodiment of the present disclosure.

FIG. 1 illustrates a perspective view of a vehicle 100, in accordance with one embodiment of the present disclosure. As shown, the vehicle 100 includes a front end 104, a rear end 106, and a vehicle body 108 extending from the front end 104 to the rear end 106 and defining a passenger compartment for facilitating a seating of one or more passengers inside the vehicle 100. Further, the vehicle 100 includes a plurality of wheels 112 supporting the vehicle body 108 on a surface and enables a movement of the vehicle 100 over the surface. As shown in the illustrated embodiment, the vehicle body 108 includes a floor 114 on which one or more seats may be mounted and a roof 116 arranged opposite to the floor 114 and supported on a plurality of pillars, for example, A-pillars 118, B-pillars 120, and C-pillars 122 of the vehicle body 108.

The vehicle 100 also includes a front windshield 126 arranged between the A-pillars 118 and the roof 116 of the vehicle 100. Moreover, the vehicle body 108 includes a hood 128 extending forwardly of the front windshield 126 to the front end 104 to cover an engine compartment from top, and a pair of fenders 130 extending along a portion of longitudinal sides of the vehicle 100. Each of the fenders 130 extends between an associated front door 134 of the passenger compartment and a front bumper 138 of the vehicle body 108. Each fender 130 extends downwardly of associated A-pillar 118 and forwardly of the associated front door 134.

Further, the vehicle body 108 includes a pair of pillar corners 146 extending rearwardly from the A-pillars 118 in the longitudinal direction and arranged between the A-pillars 118 and the front doors 134. Each pillar corner 146 extends upwardly from the fender 130 to the A-pillar 118. Accordingly, each pillar corner 146 is disposed between the associated A-pillar 118, the front door 134, and the fender 130. In the illustrated embodiment, the pillar corner 146 includes a substantially triangular shape with one vertex of the triangle arranged at a junction of the A-pillar 118 with the fender 130, while a side, disposed opposite to the vertex, of the triangle is arranged substantially parallel to an edge 148 of the front door 134.

To cover the A-pillars 118 and the pillar corners 146, the vehicle 100 includes a pair of garnish assemblies 150. It may be appreciated that the pillar garnish assemblies 150 are similar in structure, arrangement, and assembly, and therefore only one pillar garnish assembly 150 is described in detail. As shown, the pillar garnish assembly 150 includes a pillar garnish 152 arranged to cover the A-pillar 118 and a corner garnish 184 pivotally coupled to the pillar garnish 152 and arranged to cover the pillar corner 146.

Figure 2:
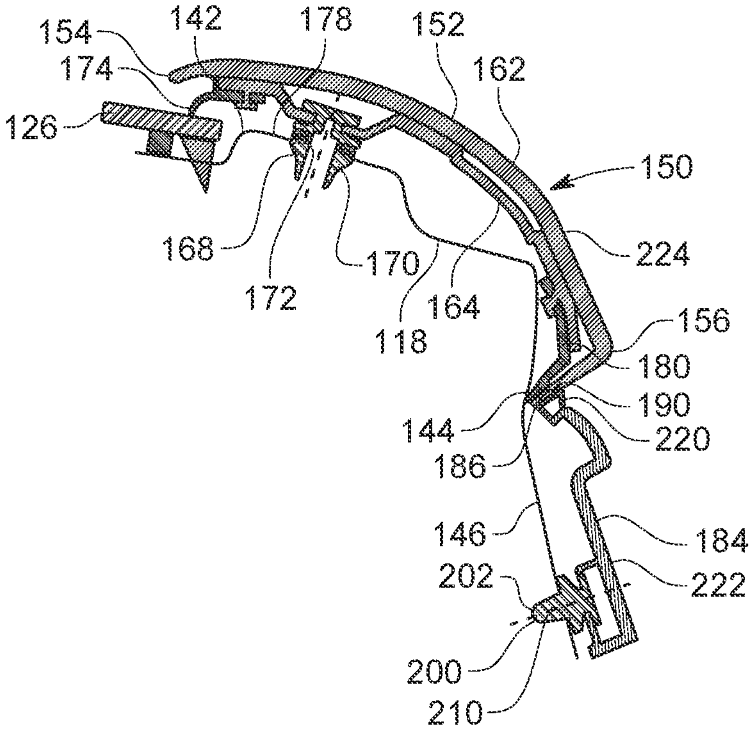
FIG. 2 is a sectional view of the vehicle along section line A-A of FIG. 1 depicting a pillar garnish assembly of the vehicle, in accordance with one embodiment of the present disclosure.

FIG. 2 is a sectional view of the vehicle 108 along section line A-A of FIG. 1 depicting the pillar garnish assembly 150 of the vehicle 108. As illustrated in FIG. 2, the A-pillar 118 includes a first edge 142 that is disposed proximate to the front windshield 126, and a second edge 144 that is arranged proximate to the front door 134. As shown, the first and second edges 142, 144 extend vertically from the hood 128 to the roof 116 in the vertical direction.

In the illustrated embodiment, the pillar garnish 152 includes a first lateral end 154 extending outwardly of the first edge 142 of the A-pillar 118 in a lateral direction and arranged above the front windshield 126 and a second lateral end 156 arranged proximate to the second edge 144 of the A-pillar 118. As shown, the pillar garnish 152 extends along an entire width of the A-pillar 118 in the lateral direction of the vehicle 100.

The pillar garnish 152 includes a substantially arcuate shape and includes an outer garnish section 162 and an inner garnish section 164 disposed underneath the outer garnish section 162. The outer garnish section 162 is engaged with the inner garnish section 164, while the inner garnish section 164, is connected or secured to the A-pillar 118 via a plurality of first engagement structures 168, for example, a plurality of first clips 170, arrayed in the vertical direction along a length of the pillar garnish 150 (i.e., a length of the A-pillar 118). It may be appreciated that upper portions of the first clips 170 are engaged or secured to the inner garnish section164. Further, as shown, the A-pillar 118 defines a plurality of holes 172, and lower portions of the first clips 170 extend inside the holes 172 in the assembly of the pillar garnish 152 with the A-pillar 118.

Moreover, the pillar garnish assembly 150 includes a first gasket 174 connected to the pillar garnish 152 (i.e., inner garnish section 164) and arranged to contact the front windshield 126 to prevent any leakage of the water or air underneath the inner garnish section 164 and the outer surface or front surface 178 of the A-pillar 118. Further, the pillar garnish assembly 150 includes a second gasket 180 arranged proximate to the second lateral end 156 of the pillar garnish section 152, contacting the A-pillar 118 to prevent any leakage of the water or air underneath the inner garnish section 164 and the outer surface 178 of the A-pillar 118. Similar to the first gasket 174, the second gasket 180 is also attached to the inner garnish section 164 and extends underneath the inner garnish section 164.

Additionally, the pillar garnish assembly 150 includes a hinge 186 pivotally coupling the corner garnish 184 to the pillar garnish 152. In an embodiment, the hinge 186 is a living hinge 190. The corner garnish 184 is adapted to pivot or rotate about a pivot axis 191 (shown in FIG. 1) that extends substantially parallel to the second edge 144 of the A-pillar 118. Accordingly, the pivot axis 191 extends in the direction of the extension of the second lateral end 156 that extends in the direction of extension of the second edge 144 of the A-pillar 118 from the hood 128 to the roof 116.

Further, the corner garnish 184 extends in the lateral direction from a location proximate to the second lateral end 144 and covers the pillar corner 146. The corner garnish 184 includes a shape substantially identical to the shape of the pillar corner 146. In the illustrated embodiment, the corner garnish 184 includes a substantially triangular shape having a first side 192 extending along a portion of the second end 156 of the pillar garnish 152 (i.e., the second edge 144 of the A-pillar 118), a second side 194 extending along the edge 148 of the front door 134, and a third side 196 extending along an upper edge 198 of the fender 130. It may be appreciated that the first side 192 of the corner garnish 184 is pivotally coupled to the outer garnish section 162 such that the pivot axis 191 extends along the first side 192 of the corner garnish 184.

Further, the pillar garnish assembly 150 includes a plurality of second engagement structures 200, for example, a plurality of second clips 202, attached to the corner garnish 184 and for engaging the corner garnish 184 with the pillar corner 146. As shown, the pillar corner 146 defines a plurality of slots 210, and lower portion of the second clips 202 extend inside the slots 210 in the assembly of the corner garnish 184 with the pillar corner 146, while the upper portions of the second clips 202 are attached or secured to the corner garnish 184.

Moreover, the pillar garnish assembly 150 includes a seal 220 arranged at an interface of the pillar garnish 152 (i.e., outer garnish section 162) and the corner garnish 184 to provide a sealing and to prevent any leakage of water or dust underneath the pillar garnish 152 and/or the corner garnish 184. Also, the seal 220 is shaped, structured, and arranged such that seal 220 prevents a contact between an outer surface 222 of the corner garnish 184 and an outer surface 224 of the outer garnish section 162, when the corner garnish 184 is pivoted or rotated relative to the pillar garnish 152 during installation of the pillar garnish assembly 150 to the vehicle body 108.

Figure 3:
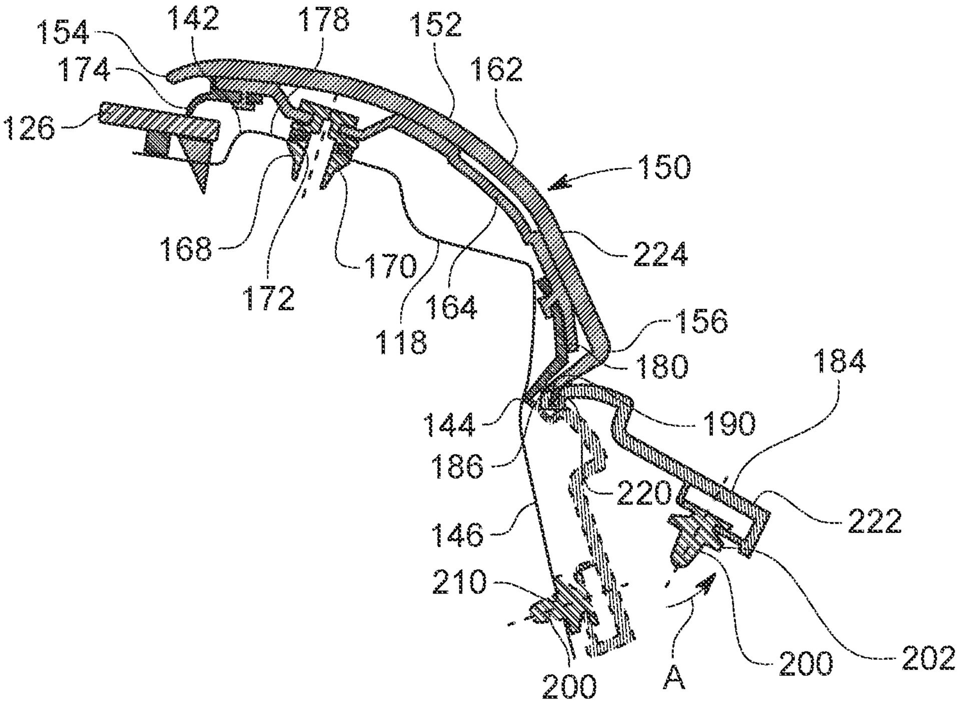
FIGS. 3-4, depict various steps of a method of installing the pillar garnish assembly on a vehicle body of the vehicle, in accordance with one embodiment of the present disclosure.
Figure 4:
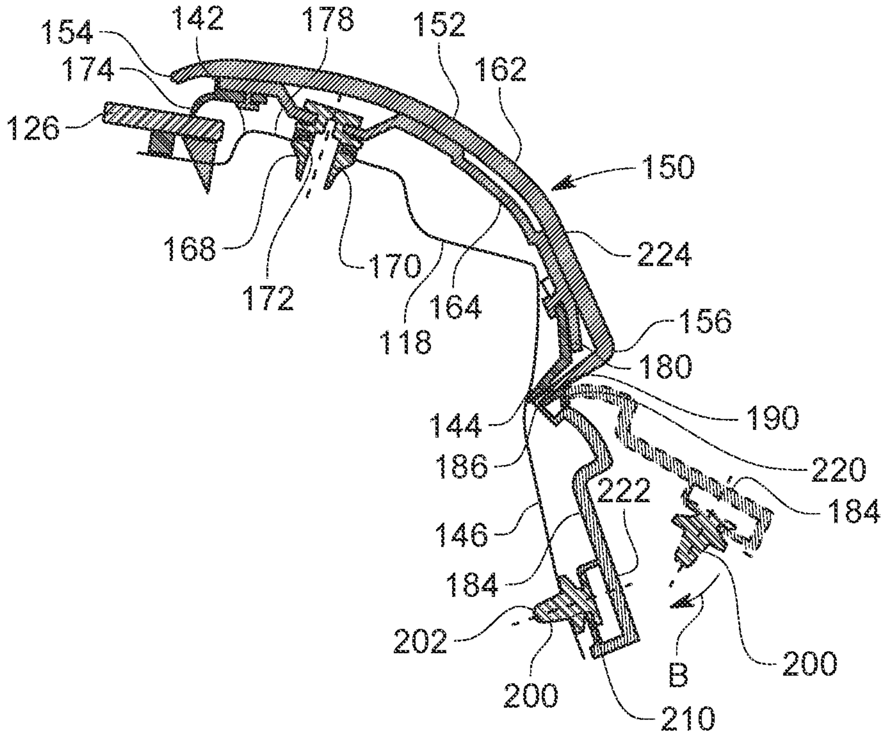

A method for installation of the pillar garnish assembly 150 to the vehicle body 108 is now described with reference to FIG. 3, and FIG. 4. For installation, a technician installs or mounts the pillar garnish 152 to the A-pillar 118. Initially, the technician may at first rotate or pivot the corner garnish 184 in a first direction 'A' about the pivot axis 191 and relative to the outer garnish section 162 (i.e., pillar garnish 152) to move the corner garnish 184 outwardly, as shown in FIG. 3, and then positions the pillar garnish 152 such that the pillar garnish 152 is arranged covering the A-pillar 118. Thereafter, the technician engages the pillar garnish 152 with the A-pillar 118 by inserting lower portions of the first clips 170 inside the holes 172 of the A-pillar 118. It may be appreciated that during rotation or pivoting of the corner garnish 184 in the first direction 'A', the seal 220 limits the rotation beyond a predefined angle and thereby prevents the contact of the corner garnish 184 with the pillar garnish 152.

Upon engaging the pillar garnish 152 to the A-pillar 118, the technician engages the corner garnish 184 with the pillar corner 146. In order to do so, the technician rotates or pivots the corner garnish 184 about the pivot axis 191 and relative to the pillar garnish 152 in a second direction 'B' opposite to the first direction 'A' (i.e., the technician rotates the corner garnish 184 inwardly) and inserts lower portions of the second clips 202 inside the slots 210, as shown in FIG. 4. In this manner, the hinge 186 enables combining of the pillar garnish 152 with the corner garnish 184 as a single component, and facilitates in assembling the pillar garnish assembly 150 in a single process, rather than having two separate components as with the prior art pillar garnish assembly and installation of the two separate components.

The foregoing description of embodiments and examples has been presented for purposes of illustration and description. It is not intended to be exhaustive or to limit the disclosure to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the disclosure is, of course, not limited to the examples or embodiments set forth herein, but can be employed in any number of applications and equivalent devices by those of ordinary skill in the art. Rather it is hereby intended the scope of the disclosure be defined by the claims appended hereto.

What is claimed is:

1. A pillar garnish assembly for a vehicle, the pillar garnish assembly comprising:

a pillar garnish adapted to be provided on a front surface of a pillar of the vehicle;

a plurality of first clips secured to the pillar garnish and configured to engage corresponding holes of the pillar;

a corner garnish pivotally coupled to the pillar garnish and adapted to pivot relative to the pillar garnish about a pivot axis, wherein the corner garnish is adapted to cover a pillar corner disposed adjacent to the pillar of the vehicle; and a plurality of second clips secured to the corner garnish and configured to engage corresponding slots of the pillar corner, wherein the corner garnish is rotatable in a first direction relative to the pillar garnish to permit the plurality of first clips to engage the corresponding holes of the pillar, and wherein, after engagement of the plurality of first clips with the corresponding holes of the pillar, the corner garnish is rotatable in a second direction opposite to the first direction to permit the plurality of second clips to engage the corresponding slots of the pillar corner.

2. The pillar garnish assembly of claim 1 further includes a hinge arranged between the pillar garnish and the corner garnish and to pivotally couple the corner garnish to the pillar garnish.

3. The pillar garnish assembly of claim 2, wherein the hinge is a living hinge.

4. The pillar garnish assembly of claim 1 further comprises a seal arranged at an interface of the pillar garnish and the corner garnish to prevent a contact of an outer surface of the corner garnish with the pillar garnish during pivoting of the corner garnish relative to the pillar garnish.

5. The pillar garnish assembly of claim 1, wherein the first clips are secured to the pillar garnish to enable coupling of the pillar garnish with the pillar, and the second clips are secured to the corner garnish to couple the corner garnish with the pillar corner.

6. The pillar garnish assembly of claim 5, wherein the pillar garnish includes an outer garnish section and an inner garnish section arranged beneath the outer garnish section, wherein the first clips are secured to the inner garnish section.

7. The pillar garnish assembly of claim 5, wherein the first clips and the second clips are arranged to be engaged during different stages of installation of the pillar garnish assembly to the vehicle.

8. A vehicle, comprising:

a pair of pillars;

a windshield arranged between the pair of pillars;

at least one pillar corner arranged adjacent to an associated pillar of the pair of pillars and extending in a longitudinal direction from the associated pillar, wherein the pillar corner is disposed between the associated pillar, a door, and a fender of the vehicle; and a pillar garnish assembly arranged to cover the associated pillar and the pillar corner, the pillar garnish assembly comprising a pillar garnish arranged to cover a front surface of the associated pillar of the vehicle, a plurality of first clips secured to the pillar garnish and configured to engage corresponding holes of the associated pillar, a corner garnish arranged to cover the associated pillar corner and pivotally coupled to the pillar garnish, wherein the corner garnish is adapted to pivot relative to the pillar garnish about a pivot axis extending parallel to an edge of the associated pillar, and a plurality of second clips secured to the corner garnish and configured to engage corresponding slots of the pillar corner, wherein the corner garnish is rotatable in a first direction relative to the pillar garnish to permit the plurality of first clips to engage the corresponding holes of the associated pillar, and wherein, after engagement of the plurality of first clips with the corresponding holes of the associated pillar, the corner garnish is rotatable in a second direction opposite to the first direction to permit the plurality of second clips to engage the corresponding slots of the pillar corner.

9. The vehicle of claim 8 further includes a hinge arranged between the pillar garnish and the corner garnish and to pivotally couple the corner garnish to the pillar garnish.

10. The vehicle of claim 9, wherein the hinge is a living hinge.

11. The vehicle of claim 8 further comprises a seal arranged at an interface of the pillar garnish and the corner garnish to prevent a contact of an outer surface of the corner garnish with the pillar garnish during pivoting of the corner garnish relative to the pillar garnish.

12. The vehicle of claim 8, wherein the first clips are secured to the pillar garnish to enable coupling of the pillar garnish with the associated pillar, and the second clips are secured to the corner garnish to couple the corner garnish with the pillar corner.

13. The vehicle of claim 12, wherein the pillar garnish includes an outer garnish section and an inner garnish section arranged beneath the outer garnish section, wherein the first clips are secured to the inner garnish section.

14. The vehicle of claim 12, wherein the first clips and the second clips are arranged to be engaged during different stages of installation of the pillar garnish assembly to the vehicle.

15. A method for installing a pillar garnish assembly to a vehicle body, the method comprising:

rotating a corner garnish of the pillar garnish assembly in a first direction relative to a pillar garnish about a pivot axis;

engaging the pillar garnish with a pillar of the vehicle body upon rotation of the corner garnish in the first direction;

rotating the corner garnish in a second direction opposite to the first direction upon engagement of the pillar garnish with the pillar; and securing the corner garnish to a pillar corner of the vehicle body, wherein the pillar corner is disposed adjacent to the pillar.

16. The method of claim 15, wherein the pillar garnish assembly includes a plurality of first engagement structures attached to the pillar garnish, and the pillar garnish is engaged to the pillar by engaging the plurality of first engagement structures to the pillar.

17. The method of claim 16, wherein the plurality of first engagement structures includes a plurality of first clips, and engaging the pillar garnish to the pillar includes inserting the plurality of first clips inside a plurality of holes of the pillar.

18. The method of claim 15, wherein the pillar garnish assembly includes a plurality of second engagement structures attached to the corner garnish, and the corner garnish is secured to the pillar corner by engaging the plurality of second engagement structures to the pillar corner.

19. The method of claim 18, wherein the plurality of second engagement structures includes a plurality of second clips, and engaging the corner garnish to the pillar corner includes inserting the plurality of second clips inside a plurality of slots of the pillar corner.

20. The method of claim 18, wherein the pillar assembly include a living hinge arranged at a junction of the pillar garnish and the corner garnish to pivotally couple the corner garnish to the pillar garnish.

* * * * *